United States Patent
Tian et al.

(10) Patent No.: US 10,451,960 B2
(45) Date of Patent: Oct. 22, 2019

(54) LASER LIGHT SOURCE AND PROJECTION DISPLAY DEVICE

(71) Applicants: Hisense Co., Ltd., Qingdao (CN); Hisense International Co., Ltd., Qingdao (CN); HISENSE USA CORP., Suwanee, GA (US)

(72) Inventors: Youliang Tian, Qingdao (CN); Xianrong Liu, Qingdao (CN); Wei Li, Qingdao (CN)

(73) Assignees: Hisense Co., Ltd., Qingdao, Shandong (CN); Hisense International Co., Ltd., Qingdao, Shangong (CN); Hisense USA Corp., Suwanee, GA (US)

( * ) Notice: Subject to any disclaimer, the term of this patent is extended or adjusted under 35 U.S.C. 154(b) by 29 days.

(21) Appl. No.: 15/891,023

(22) Filed: Feb. 7, 2018

(65) Prior Publication Data

US 2018/0164669 A1 Jun. 14, 2018

Related U.S. Application Data

(63) Continuation of application No. PCT/CN2015/088942, filed on Sep. 6, 2015.

(30) Foreign Application Priority Data

Jun. 3, 2015 (CN) .......................... 2015 1 0298364

(51) Int. Cl.
G03B 21/20 (2006.01)

(52) U.S. Cl.
CPC ......... *G03B 21/208* (2013.01); *G03B 21/204* (2013.01); *G03B 21/2013* (2013.01); *G03B 21/2066* (2013.01)

(58) Field of Classification Search
CPC .. G03B 21/006; G03B 21/008; G03B 21/204; G03B 21/208; G03B 21/2013;
(Continued)

(56) References Cited

U.S. PATENT DOCUMENTS

2008/0252863 A1* 10/2008 Kojima ................. G03B 21/28
353/99
2012/0162614 A1* 6/2012 Kobayashi .......... G03B 21/204
353/31

(Continued)

FOREIGN PATENT DOCUMENTS

| CN | 102591109 A | 7/2012 |
| CN | 102681320 A | 9/2012 |

(Continued)

OTHER PUBLICATIONS

First Office Action for Chinese Application No. 201580081290.X dated Oct. 15, 2018; 8 pages.

(Continued)

*Primary Examiner* — Sultan Chowdhury
(74) *Attorney, Agent, or Firm* — Brinks Gilson & Lione (57) ABSTRACT

A laser light source is disclosed that includes a laser device, a first diffusion element, a fluorescence wheel, and a second diffusion element. The fluorescence wheel emits a fluorescent light when excited by the laser light, and before reaching the fluorescence wheel, the laser light emitted by the laser device is transmitted through the first diffusion element that is fixedly arranged. As the second diffusion plate rotates about its axis, the laser light from the first diffusion element and the fluorescent light from the fluorescence wheel transmit through the second diffusion plate.

18 Claims, 6 Drawing Sheets

(58) Field of Classification Search
CPC .......... G03B 21/2033; G03B 21/2053; H04N 9/3114; H04N 9/3152; H04N 9/3161; H04N 9/3164
See application file for complete search history.

(56) References Cited

U.S. PATENT DOCUMENTS

| | | |
|---|---|---|
| 2012/0182529 A1 | 7/2012 | Otani |
| 2012/0229780 A1 | 9/2012 | Sato |
| 2013/0100417 A1 | 4/2013 | Yang et al. |
| 2014/0118991 A1 | 5/2014 | Lin et al. |
| 2014/0132937 A1* | 5/2014 | Daniels ................ G03B 21/208 353/98 |
| 2014/0176914 A1 | 6/2014 | Mueller |
| 2014/0176916 A1 | 6/2014 | Masuda |
| 2014/0211169 A1 | 7/2014 | Kitano et al. |
| 2014/0211170 A1 | 7/2014 | Kitano et al. |
| 2014/0232992 A1 | 8/2014 | Egawa |
| 2014/0247429 A1* | 9/2014 | Ogino .................. H04N 9/3111 353/31 |
| 2015/0098065 A1* | 4/2015 | Tanaka ............... G03B 21/2013 353/84 |
| 2018/0164669 A1 | 6/2018 | Tian et al. |

FOREIGN PATENT DOCUMENTS

| | | |
|---|---|---|
| CN | 103032672 A | 4/2013 |
| CN | 103792635 A | 5/2014 |
| CN | 103888702 A | 6/2014 |
| CN | 103888740 A | 6/2014 |
| CN | 103926706 A | 7/2014 |
| CN | 103969935 A | 8/2014 |
| CN | 203786412 U | 8/2014 |
| CN | 204009242 U | 12/2014 |
| CN | 104298059 A | 1/2015 |
| CN | 105116675 A | 12/2015 |
| JP | 2008134269 A | 6/2008 |
| JP | 2013-250494 A | 12/2013 |

OTHER PUBLICATIONS

International Preliminary Report on Patentability for International Application No. PCT/CN2015/088942 dated Dec. 5, 2017; 4 pages.
International Search Report for International Application No. PCT/CN2015/088942 dated Mar. 3, 2016; 8 pages.
First Office Action for Chinese Application. No. 201510509759.7, 4 pages.
First Search Report for Chinese Application No. 2015105097597, 2 pages.
Supplemental Search for Chinese Application No. 2015105097597, 1 page.
Written Opinion of International Search Authority for International Application No. PCT/CN2015/088942 dated Mar. 3, 2016; 9 pages.

* cited by examiner

LASER LIGHT SOURCE AND PROJECTION DISPLAY DEVICE

CROSS-REFERENCE TO RELATED APPLICATION

This application is a Continuation Application of PCT/CN2015/088942, filed Sep. 6, 2015, which claims priority to Chinese Patent Application No. 201510298364.7 filed on Jun. 3, 2015, titled "LASER LIGHT SOURCE AND PROJECTION DISPLAY DEVICE", the entirety of each are hereby incorporated by reference herein.

TECHNICAL FIELD

The present disclosure relates to the field of projection display, in particular to a laser light source and a projection display device.

BACKGROUND

A laser light is a light source emitting monochromatic coherent beams, with high luminance and strong directionality. Owing to the numerous advantages, the laser light has been gradually applied as a light source in the technical field of projection display in recent years. However, because of the high coherence of the laserlight, the speckle effect is inevitable, such phenomenon is especially obvious in the solutions within which a pure laser light is used as the light source, and it also exists in the solutions within which a laser light and a fluorescent light are used, as well as in the solutions within which the mixed light source of a laser light and a LED is used. The speckle refers to the spatial interference of the light after scattering when a coherent light source irradiates on a rough object, and the spatial interference of the light is owing to the same wave length and the constant phase of the light. There will be some constructive spatial interference and some destructive spatial interference, the final result is that alternated light and shade granular spots will appear on the screen, namely, some unfocused spots will flash, it is easy to feel dizzy after watching for long time. And it will undoubtedly result in the quality reduction of projected images to lower the user's experience of watching.

How to reduce the speckle effect of laser light caused by its inherent qulities at the same time of applying one or multiple laser light sources has become a technical problem to be solved.

SUMMARY

According to some embodiments, this disclosure provides a laser light source, comprising a laser device, a first diffusion element, a fluorescence wheel and a second diffusion element. The fluorescence wheel emits a fluorescent light when excited by a laser light. Before reaching the fluorescence wheel, the laser light emitted by the laser device transmits the first diffusion element. The first diffusion element is fixedly arranged and the second diffusion element is controlled to rotate around its axis. The laser light from the first diffusion element and the fluorescent light from the fluorescence wheel transmit the second diffusion element.

According to other embodiments, this disclosure provides a projection display device comprising a laser light source, a light machine, a lens and a projection screen. The laser light source provides illumination for the light machine, and images are projected to the projection screen by the lens for displaying, and the laser light source is the laser light source of any of the above technical solutions.

DETAILED DESCRIPTION

In order to make the objects, technical solutions and advantages of the disclosure clearer, the disclosure will be further described in details below by combining with the drawings. The embodiments described may only represent partial embodiments of the disclosure and not an entirety of an embodiment. Based on the embodiments in the disclosure, all the other embodiments obtained by a person of skill in the art without creative labor are within the protective scope of the disclosure.

Figure 1:
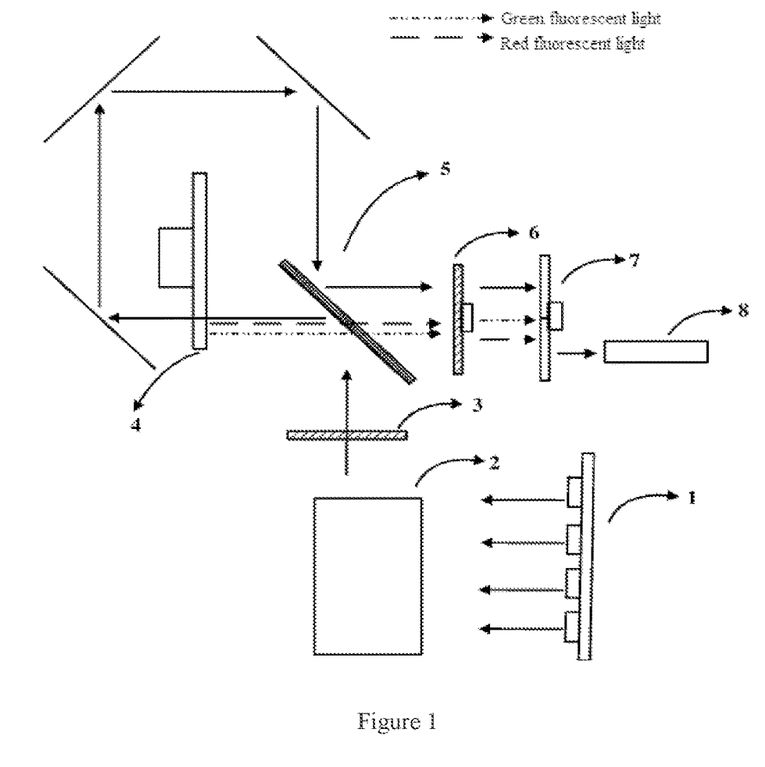
FIG. 1 shows a schematic diagram of a laser light source in some embodiments of the disclosure.

Some embodiments of the disclosure provides a laser light source. As shown in FIG. 1, the laser light source comprises a laser device 1, a first diffusion element 3, a fluorescence wheel 4 and a second diffusion element 6. The first diffusion element 3 is fixedly arranged in the optical path before the laser light transmits into the fluorescence wheel 4, so that the laser light emitted by the laser device 1 transmits the first diffusion element before reaching the fluorescence wheel 4. The laser light from the first diffusion element 3 and the fluorescent light emitted by the fluorescence wheel 4 being excited by the laser light transmit the second diffusion element 6, and the second diffusion element 6 is controlled to rotate around its axis.

Figure 2:
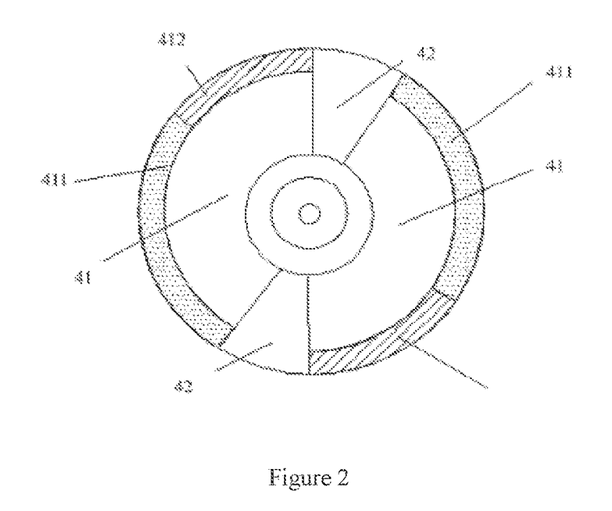
FIG. 2 shows a schematic diagram of a plan view of a fluorescence wheel in some embodiments of the disclosure.

The laser device 1 is a blue laser device and can be arranged in a set or multiple sets of arrays. In order to form the white light, a wavelength converter is also required to produce a light of other wavelength or other color. In some embodiments of the disclosure, the fluorescence wheel serves as the wavelength converter, and the incident surface of the fluorescence wheel is coated with green fluorescent powder and red fluorescent powder, respectively. The green fluorescent powder and the red fluorescent powder can be excited by the blue laser light to emit a green fluorescent light and a red fluorescent light, respectively. As shown in FIG. 2, the fluorescence wheel 4 comprises a reflection part 41 and a transmission part 42, and the transmission part is used for transmitting the blue laser light. The reflection part 41 comprises a green fluorescent powder zone reflection part 411 and a red fluorescent powder zone reflection part 412.

Figure 3:
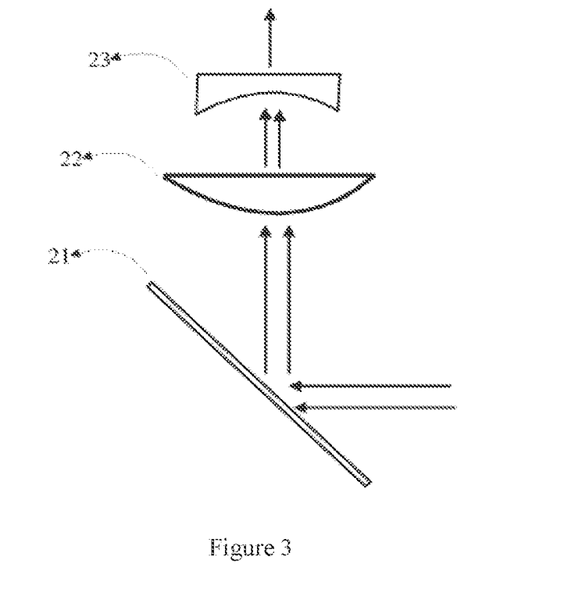
FIG. 3 shows a schematic diagram of a beam shaping device in some embodiments of the disclosure.

The laser light spot emitted by the laser device may have uneven luminance and too large of a beam area, hence the beam shaping of reflection, refraction, etc. for the laser light is required to reduce the beam area and homogenize the beam energy before the laser light transmitting the fluorescence wheel, so as to achieve better efficiency of exciting fluorescent light. In some embodiments of the disclosure, an optical system and the first diffusion element 3 forms a beam shaping device 2, and jointly complete the beam shaping for the blue laser light. An exemplary optical system is shown in FIG. 3, which comprises a reflector unit 21, a convex lens 22 and a concave lens 23. The first diffusion element 24 is fixedly arranged behind the concave lens. The convex lens 22 and the concave lens 23 form a telescope system.

The reflector unit 21 may be a Fresnel lens or a reflector set to play a role in reducing beam separation and combining beams for the laser light. In some embodiments of the disclosure, before reaching the reflector, the blue laser light emitted by the laser device also passes a collimating lens (not shown in the figure) for collimation to reduce the angle of diffusion of the laser light, so that more quantity of light can reach the reflector unit to improve the shaping efficiency of the laser light.

After the beam combination by the reflector unit, the laser light passes through the telescope system. The telescope system is used for further beam reduction of the laser light, reduce the size of the light spot and improve the transmittance of the beam in the optical devices at the back. After passing through the telescope system and before transmitting the fluorescence wheel 4, the laser light also passes through a key component at the back of the beam shaping device, the first diffusion element 3. The first diffusion element diffuses the laser light, on the one hand, it can increase the spacial phases for the blue laser beam and destroy the constant phase to a certain extent which is the condition for producing interference, this has a certain action on speckle dissipating; on the other hand, the diffusion of the blue laser beam can also homogenize the beam energy, the homogenized beam or light spot can avoid that the surface of the fluorescence wheel is burned out and damaged by the laser beam with more centralized light intensity when the laser light directly transmits on the surface of the fluorescence wheel under uneven intensity distribution and centralized energy, the burning out and the damaging will result in that the fluorescence wheel is unable to normally excite the fluorescent light. To arrange the first diffusion element 3 at the back of the beam shaping device, it is considered that the laser beam has a small light spot area through bunching, thus it is favorable for transmitting into the optical system below through the optical lens, and at that time the diffusion efficiency of the laser beam can be improved. At the same time, in order to achieve the condition for exciting the the fluorescence wheel when the laser light transmits into it, the last homogenization of the light spot must be performed for the uniform distribution of energy.

In some embodiments of the disclosure, the first diffusion element 3 can be completely coated with diffusers in uniform distribution. Frosted glass or binary components can be chosen, which can produce diffuse reflection for light and destroy the directionality of the laser light.

The laser light after beam shaping reaches the fluorescence wheel 4. The fluorescence wheel 4 is with a rotating shaft can be driven by a motor to rotate, and the transmission part 42 and the reflection part 41 will be alternately in the positions into which the excitation light source transmits. Accordingly, when the laser light transmits to the surface of the fluorescence wheel, it can not only transmit the laser light, but can also be excited by the laser light to emit the fluorescent light. When the fluorescence wheel 4 rotates to the position of the reflection part 411, the blue laser light irradiates the green fluorescent powder to emit the green fluorescent light which is reflected by the surface of the fluorescence wheel 4 to reach a light merging component 5 (e.g., a light merging lens). When the fluorescence wheel 4 rotates to the position of the reflection part 412, the blue laser light irradiates the red fluorescent powder to emit the red fluorescent light which is also reflected by the surface of the fluorescence wheel 4 to reach the light merging component 5. When the fluorescence wheel rotates to the position of the transmission part 42, the transmission part can be transparent glass, the blue laser light will transmit the transmission part 42 and then return to the light merging component 5 from the back of the fluorescence wheel 4 and through the loop of the blue laser light, and the loop of the blue laser light is usually composed of relay lenses and reflectors.

In some embodiments of the disclosure, a collimating lens set can be arranged on the front/back of the fluorescence wheel 4 and used for reducing the angles of diffusion of the transmitted laser light or the reflected fluorescent lights and enhancing the degree of beam convergence.

In some embodiments of the disclosure, a dichroscope can be chosen as the light merging component 5, and it can transmit the laser light and reflect the fluorescent lights from the fluorescence wheel. After the dichroscope, the transmitted laser light and the reflected fluorescent lights can converge to the same optical path through a focusing lens set (not shown in the figure).

In some embodiments of the disclosure, the laser light source further comprises a color filter wheel 7, and the color filter wheel 7 is provided in the emission direction of the second diffusion element 6. In some embodiments, the fluorescence wheel and the second diffusion element rotate synchronously. And in some further embodiments, the fluorescence wheel, the second diffusion element and the color filter wheel rotate synchronously.

Figure 4:
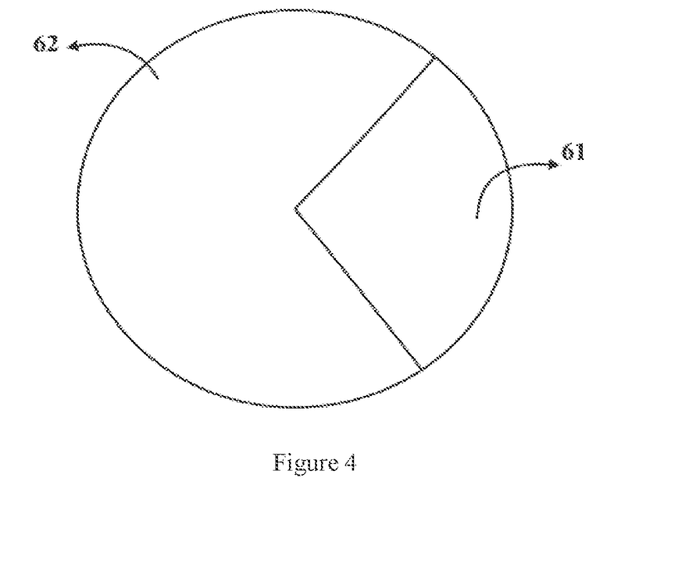
FIG. 4 shows a schematic diagram of a second diffusion element in some embodiments of the disclosure.

The laser light and the fluorescent lights pass the light merging component 5, and before being filtered and output through the color filter wheel 7 the laser light and the fluorescent lights also transmit the second diffusion element 6. For example, the second diffusion element 6 is arranged in front of the color filter wheel, and it can also be controlled by a motor to rotate. As shown in FIG. 4, the second diffusion element 6 comprises a diffusion part 61 for transmitting the blue laser light and a transparent part 62 for transmitting or penetrating the green fluorescent light and the red fluorescent light. The diffusion part 61 is coated with diffusers, the diffusers can be either binary components or frosted glass, as long as it has better diffuse reflection to light, and the diffusers can be uniformly coated. The transparent part 62 is made of materials with high transmittance, such as transparent glass. The rotating diffusion element can increase more random spatial phases for the blue laser beam to destroy the coherence of the blue laser light accordingly, and it can effectively weaken the speckle effect.

Figure 5:
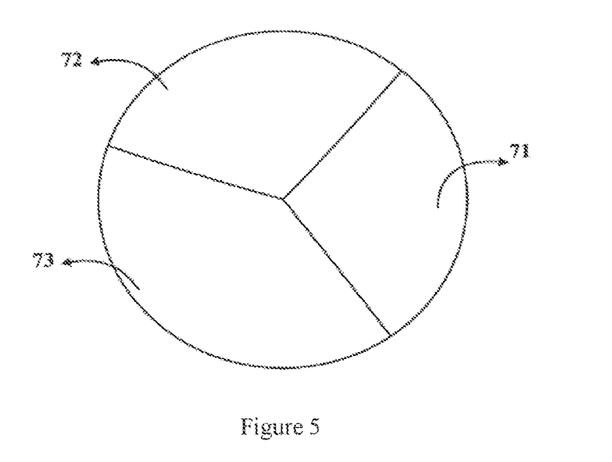
FIG. 5 shows a schematic diagram of a plan view of a color filter wheel in some embodiments of the disclosure.

As shown in FIG. 5, the color filter wheel 7 comprises a blue color filter plate 71, a green color filter plate 72 and a red color filter plate 73, which are used for filtering color of the blue laser light, the green fluorescent light and the red fluorescent light. After color filtering, the purity of color is improved, and the color expression will be better. The second diffusion element 6 and the color filter wheel 7 keep in synchronous rotation with the fluorescence wheel 4, so that the fluorescence wheel can be ensured to output the light of one primary color at a moment, the light of the primary color then transmits the corresponding diffusion part or transparent part of the second diffusion element and the color filter plate of the corresponding color on the color filter wheel in order, so as to realize the color filter output in correct time sequence.

The sequential work process of the three components can be: when the blue laser device array 1 is lighted and when the blue laser light transmits the reflection part 411 of the fluorescence wheel 4, the fluorescence wheel 4 is excited to emit the green fluorescent light, at the moment the second diffusion element 6 rotates to the position of the transparent part 62, the color filter wheel 7 rotates to the position of the green color filter plate 72, and then green light as one of the three primary colors is output after being filtered through the color filter wheel. Similarly, when the blue laser light transmits the red fluorescent powder in the reflection part 312 of the fluorescence wheel, the fluorescence wheel emits the red fluorescent light, at the moment the second diffusion element 6 also rotates to the position of the transparent part 62, the color filter wheel rotates to the position of the red color filter plate, and then red light as one of the three primary colors is output through the red color filter plate 73 of the color filter wheel. When the blue laser light passes through the transmission part 32 of the fluorescence wheel and is converted by the optical path and output through the light merging component, at the moment the second diffusion element 6 rotates to the diffusion part 61, and the color filter wheel 7 rotates to the blue color filter plate 71 to output the blue light as one of the three primary colors. In this way, through the synchronous rotation, the three primary colors are sequentially output from the color filter wheel.

In some embodiments of the disclosure, for the more uniform synchronization of the second diffusion element 6 with the color filter wheel 7, the second diffusion element 6 and the color filter wheel 7 can be coaxially connected, the second diffusion element 6 is opposite to the blue color filter plate 71, and in this way, the two components can be driven to rotate together only by one motor.

In some embodiments of the disclosure, the blue laser light emitted by the laser device firstly passes through the first diffusion element 3 in the beam shaping device 2, the first diffusion element 3 can increase the spacial phases of the laser light to play a certain role in diffusing and homogenizing the laser beam. After merging with the green and red fluorescent lights, the blue laser light passes through the moving second diffusion element 6, and the moving diffusion element and the fixed diffusion element matched with each other have a better technical effect of speckle dissipating.

In terms of principle, when the laser light transmits a fixed diffusion element, the fixedly arranged diffusion element can increase the spatial phases of the laser beam, and accordingly destroy the constant phase which is the condition for producing interference to a certain extent. When the laser light transmits a moving diffusion element, the moving diffusion element has better diffusion of laser beam, it can produce some random phases spatially to more effectively destroy the constant phase as the condition for interference, it creates some independent speckle patterns, by using the integral action of human eyes, the phenomenon of light and shade spots formed by the independent speckle patterns in human brain will be weakened to weaken the speckle effect accordingly. But it can created the independent speckle patterns in a limited number.

In some embodiments of the disclosure, the fixedly arranged first diffusion element 3 can increase the spacial phases of blue laser beam, and accordingly destroy the constant phase which is the condition for producing interference to a certain extent. When the blue laser light and the fluorescent lights transmit the moving second diffusion element 6, since the moving diffusion element itself can produce some random spatial phases for the laser beam compared with the fixedly arranged diffusion element, and accordingly it can effectively destroy the coherence of the laser light; whereas, in some embodiments of the disclosure, the moving diffusion element can further increase more random phases on the basis of the spatial phases increased by the fixed diffusion element by matching the fixed diffusion element with the moving diffusion element, so that the degree of decoherence for the original laser beam will be higher, more independent speckle patterns can be formed on the projected image, however, the more the independent speckle patterns are, the weaker the phenomenon of light and shade spots will be by using the integral action of human eyes, and accordingly the speckle effect of the laser light can be effectively weakened.

To sum up, the speckle dissipating system formed by a fixedly arranged diffusion element and a moving diffusion element for the mixed laser light source formed by the blue laser light with the green fluorescent light and the red fluorescent light can effectively weaken the speckle effect of the laser light source and improve the display quality of projected images.

As the improvement for the solution of producing fluorescent lights by the fluorescence wheel in the above embodiment, the red fluorescent powder can be replaced by a yellow fluorescent powder, considering that more red fluorescent light is converted into invalid thermal energy in the process of excitation in practical application, the excitation efficiency for the red fluorescent light is lower, and the luminance of the entire light source is also affected. The fluorescence wheel can be excited to emit a yellow fluorescent light, the transparent part of the second diffusion element is used for transmitting the green and yellow fluorescent lights, and it is necessary to add a red color filter plate, and a transparent part or a yellow color filter plate on the color filter wheel for filtering partial yellow fluorescent light to obtain the red fluorescent light and for transmitting or filtering partial yellow fluorescent light to obtain the yellow fluorescent light, so that on the one hand, such color scheme improves the exciting efficiency of red fluorescent light and increase the luminance of the light source, on the other hand, it increases the primary color of yellow, and it can also expand the color gamut. However, the variation of the fluorescence wheel does not affect the speckle dissipating effect on the blue laser light in the entire light source scheme.

In some embodiments of the disclosure, the laser device comprises a blue laser device and a red laser device. For example, the laser device is a bicolor laser device comprising a blue laser device and a red laser device, wherein the blue laser light and the red laser light share a speckle dissipating system composed of a fixedly arranged diffusion element and a moving diffusion element, so that the speckle effect of the blue and red laser lights can be weakened at the same time to achieve the speckle dissipating effect on the laser light source.

Figure 6:
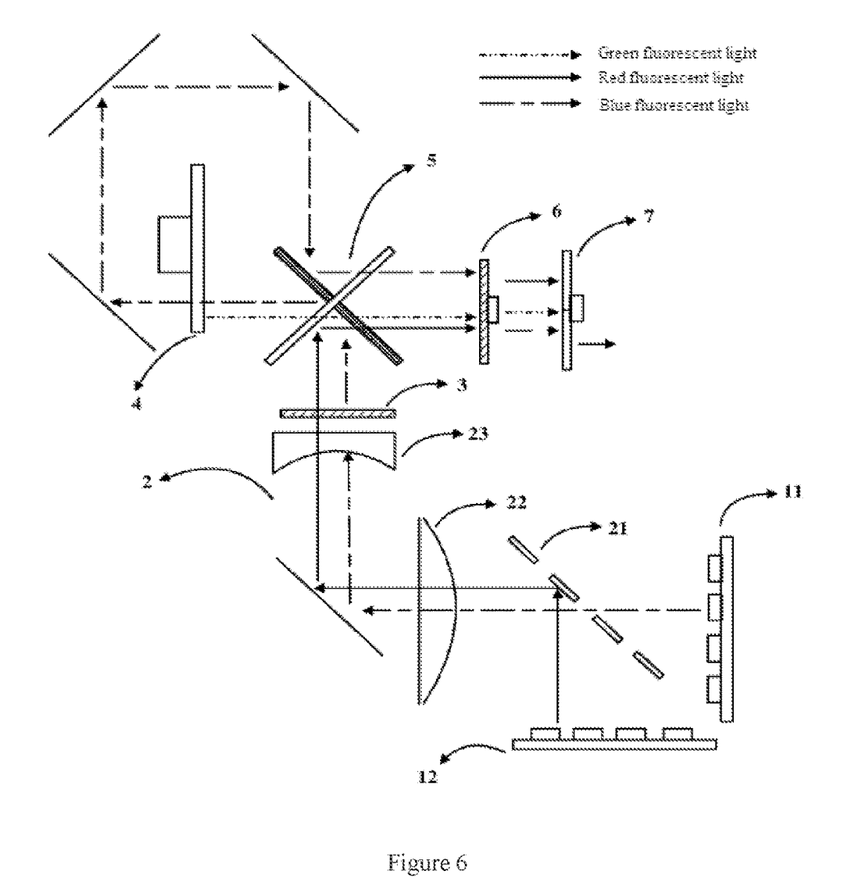
FIG. 6 shows a schematic diagram of another laser light source in some embodiments of the disclosure.

As shown in FIG. 6, the blue laser light device array 11 for outputting the blue laser light is arranged vertical to the red laser light device array 12 for outputting the red laser light, and the beams emitted by the vertically arranged arrays are also vertical to each other. There is a gap at the corner between the two laser device arrays.

The laser lights emitted by the laser devices shall also passes through a beam shaping device to further reduce their angles of diffusion, bunch the beam and form into laser light spots in uniform distribution before being used for illumination.

In order to output the three primary colors, the fluorescence wheel 4 illustrated by FIG. 6 of the disclosure is in a similar structure with the fluorescence wheel in FIG. 1, and it will not be repeated again. It is the same that it also has a reflection part and a transmission part, and it is different that the reflection part is only coated with a kind of fluorescent powder—green fluorescent powder and can be excited to emit a green fluorescent light, and in some embodiments of the disclosure, the excited light is the blue laser light.

It has been mention in the laser light source illustrated by FIG. 1 that since the laser light emitted by the laser device is not in an ideal status and has the problems of uneven distribution of luminance and energy, and bigger beam areas, in FIG. 6, the red laser light and the blue laser light shall also passes through the beam shaping device for direction conversion, beam bunching, homogenization, etc.

The beam shaping device 2 comprises a reflector unit 21, a convex lens 22, a concave lens 23, and a fixedly arranged first diffusion element 3 behind the concave lens. The convex lens 22 and the concave lens 23 form a telescope system. The beam shaping device performs the shaping of reflection, beam bunching and homogenization for the blue laser light and the red laser light in order.

The reflector unit 21 is arranged in front of the blue and the red laser device arrays and is arranged at an included angle of 45° with the two laser light arrays. The reflector unit 21 can be composed by a set of reflectors at intervals, the lens part of the reflectors can reflect one light source, the interval between the reflectors can allow to transmit another light source. Accordingly, the reflection for one light source of the blue and the red laser light sources and the transmission for another light source only by using one reflector unit, so that it not only can reduce the beam separation of the beams output by the two laser light arrays and output the synthetic beam in the same direction, it can also reach the object of compact structure.

In some embodiments of the disclosure, before reaching the reflector unit 21, the blue laser light and the red laser light also passes a collimating lens (not shown in the figure) for collimation to reduce the angle of diffusion for laser light respectively, so that more quantity of light can reach or transmit through the reflector unit to improve the shaping efficiency of the laser light.

After beam combination by the reflector unit 21, the blue laser light and the red laser light pass through the telescope system composed of the convex lens 22 and the concave lens 23 in order, the action of the telescope set here is for further bunching the laser beam, reducing the size of the light spot or the beam area, and improving the transmittance of the beam in the optical devices at the back.

After passing the telescope system, the blue laser light and the red laser light will also pass through a key component at the back of the beam shaping device 2, the first diffusion element 3. No matter for the red laser light or the blue laser light, the first diffusion element will diffuse the laser beam. On the one hand, it can increase the spacial phases of the laser beam, and destroy the constant phase which is the condition for producing interference to a certain extent, which has a certain action on speckle dissipating; on the other hand, the diffusion of the laser beam can also homogenize the beam energy, which is very important for the blue laser light, since the blue laser light serves as the excited light of the fluorescence wheel. And if the blue laser beam is not homogenized, it may cause that the surface of the fluorescence wheel is burned out and damaged by the laser beam with more centralized light intensity when the laser light directly transmits on the surface of the fluorescence wheel under uneven intensity distribution and centralized energy, the burning out and the damaging will result in that the fluorescence wheel is unable to normally excite the fluorescent light.

In some embodiments of the disclosure, the first diffusion element 3 can be completely coated with diffusers in uniform distribution. Frosted glass or binary components can be chosen, which can produce diffuse reflection for light and destroy the directionality of the laser light.

The laser light after beam shaping reaches the fluorescence wheel 4, similar with the structure and work process of the fluorescence wheel in FIG. 1, when the fluorescence wheel 4 rotates to the position of the transmission part 42, the blue laser light transmits the transmission part 42 and then return to the light merging component 5 from the back of the fluorescence wheel 4 and through the loop of the blue laser light. When the fluorescence wheel 4 rotates to the position of the reflection part 41, the blue laser light irradiates the green fluorescent powder to emit a green fluorescent light which is reflected by the surface of the fluorescence wheel 4 to reach the light merging component 5.

In some embodiments of the disclosure, a collimating lens set can be arranged on the front/back of the fluorescence wheel 4 and used for reducing the angles of diffusion for the transmitted laser light or reflected fluorescent light and enhancing the degree of beam convergence.

The red laser light after beam shaping transmits the first diffusion element and then directly transmits the light merging component 5. And in some embodiments of the disclosure, the light merging component 5 may be comprised of an X-shaped light merging lens (also referred to herein as the X light merging lens 5).

The X light merging lens 5 is composed of two lenses crossly arranged in an "X" shape, which have the filtering effect of reflecting A and transmitting B or reflecting B and transmitting A, respectively. For example, a lens for reflecting red and transmitting green, or a lens for reflecting green and transmitting red and blue, and the high reflectance and high transmittance of light can be realized by reasonable coating on the light merging lens and keeping the light away from the area with low transmittance in the center of the lens as much as possible in the design of the optical path.

In some embodiments of the disclosure, the X light merging lens 5 is composed of a lens for reflecting blue and transmitting red and green and a lens for reflecting red and transmitting blue and green, wherein, the lens for reflecting red and transmitting blue and green 51 can reflect the red laser light and transmit the blue laser light, the transmitted blue laser light is then reflected by another lens for reflecting blue and transmitting red and green 52 to the fluorescence wheel, finally it returns to the X light merging lens 5 after being conversed in a series of optical path conversions and then is reflected by the lens for reflecting blue and transmitting red and green 52 in the X light merging lens 5. Whereas, the excited green fluorescent light is reflected by the fluorescence wheel to the X light merging lens 5 and is transmitted by both the lens for reflecting red and transmitting blue and green 51 and the lens for reflecting blue and transmitting red and green 52 of the X light merging lens 5. And the red laser light is firstly reflected by the lens for reflecting red and transmitting blue and green 51, then reaches the lens for reflecting blue and transmitting red and green 52 and transmit it. The transmission path of the three colors of light in the X light merging lens is as shown by the optical path in FIG. 5. Finally, the red laser light, the blue laser light and the green fluorescent light are all pass the X light merging lens 5 and transmit in the same direction.

Figure 7:
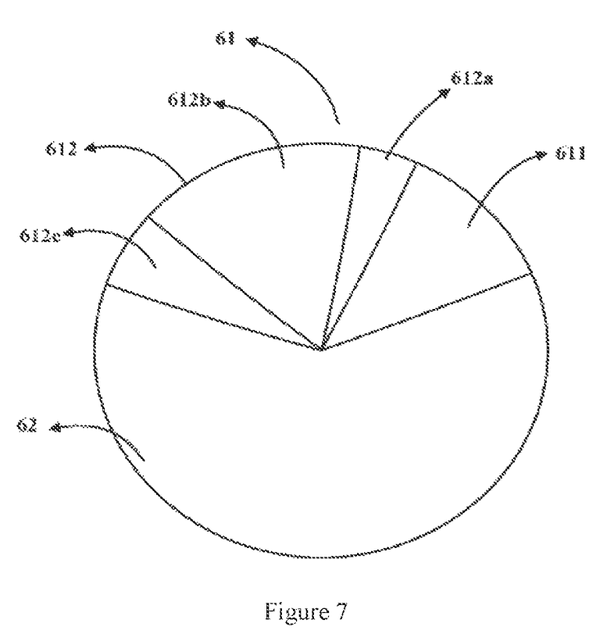
FIG. 7 shows a second schematic diagram of the second diffusion element in some embodiments of the disclosure.

In some embodiments of the disclosure, a second diffusion element 6 is arranged in front of the color filter wheel 7 and behind the light merging component 5, the second diffusion element can be controlled by a motor to rotate. As shown in FIG. 7, the second diffusion element 6 comprises a transparent part 62 for transmitting or penetrating the green fluorescent light, and it is made of materials with high transmittance, such as transparent glass. The second diffusion element 6 also comprises a diffusion part 61, wherein the diffusion part 61 comprises a blue laser light diffusion part 611 and a red laser light diffusion part 612, which are used for penetrating the blue laser light and the red laser light, respectively. In order to realize diffuse reflection, the blue laser light diffusion part 611 and the red laser light diffusion part 612 are coated with diffusers, respectively. The diffusers can be either binary components or frosted glass that can play a better role of diffuse reflection for light, and the diffusers can be uniformly coated. The coated areas of the diffusers on the two diffusion parts are different, which correspond to the fan-shaped areas on the blue color filter plate and the red color filter plate of the color filter wheel 7 which is at the back, respectively, and are related with the proportion of each primary color in white balance. In some embodiments of the disclosure, the three central angles account for 15%, 25% and 60%, respectively. The central angle of the blue laser light diffusion part 611 is 54°, the central angle of the red laser light diffusion part 612 is 90°, and the central angle of the transparent part is 216°.

At the same time, although the blue laser light and the red laser light have close coherence, owing to the different sensitivity of human eyes to the speckles formed by the red laser light and the blue laser light, the actual situation is that human eyes have higher sensitivity to the speckles formed by the red laser light, and thus more attentions shall be paid to the speckle dissipating of the red laser light. The red laser light diffusion part 612 can comprise multiple diffusion subparts, the multiple diffusion subparts have different angles of diffusion for the red laser light. Among the multiple diffusion subparts, the angles of diffusion for the red laser light of the diffusion subparts in the middle can be greater than the angles of diffusion for the red laser light of the diffusion subparts on both sides, and the areas of the diffusion subparts in the middle are also bigger than the areas of the diffusion subparts on both sides; the reason for such arrangement is considering that energy distribution of the laser light is of the Gaussian type and is more centralized in the middle, as a result, the diffusion part closer to the middle requires for greater angle of diffusion and bigger area proportion to effectively diverge and decohere the laser beam with more centralized energy.

As shown in FIG. 7, the red laser light diffusion part is divided into 3 red laser light diffusion subparts, 612a, 612b and 612c, wherein, the fan-shaped central angle is 45° for 612b, 20° for 612a and 25° for 612c. The angle of diffusion for the diffuse reflector at 612b can be set as 5°~5.5°, the angle of diffusion for the diffuse reflector at 612a can be set as 2°~2.5°, and the angle of diffusion for the diffuse reflector at 612c can be set as 2.5°~3°, the gradual arrangement owing to such settings of the diffusion subparts of the red laser light diffusion part can realize the effective decoherence for the Gaussian beams of the laser light.

The above angle distribution for the red laser light diffusion part, the blue laser light diffusion part and the transparent part in the second diffusion element are only examples and not limited to the above range of values, since the color proportions of R, G and B are related with the white balance required by the system. The white balance is an indicator for describing the accuracy of the white color obtained by merging the three primary colors of red, green and blue in a display device. The white balance will be affected by the factors of color temperature, ambient light, etc., and different white balances will display different image tones. Moreover, in the above embodiment, if the system has serious speckling phenomenon, it is necessary to reduce the angle of the transparent part and increase the angle of the diffusion part, and the diffusion element of big angle is used to weaken the speckling phenomenon.

The blue laser light, red laser light and green fluorescent light transmit the color filter wheel 7 after diffusion and transmission through the second diffusion element, similar to that in FIG. 1, the corresponding blue color filter plate, red color filter plate and green color filter plate are arranged on the color filter wheel 7, respectively to realize the sequential color filter output.

Similar to that in the laser light source illustrated by FIG. 1, the second diffusion element 6 and the color filter wheel 7 keep in synchronous rotation with the fluorescence wheel 4, so that it can be ensured to output the light of one primary color at a moment from the fluorescence wheel, the light of the primary color transmits the corresponding diffusion part or transparent part of the second diffusion element and the color filter plate of the corresponding color on the color filter wheel in order, so as to realize the color filter output in correct time sequence.

In this embodiment, the sequential work process of the speckle dissipating of the laser light is that: according to the lighting sequence of the laser device, when the blue laser device is lighted, the blue laser light after beam shaping transmits the first diffusion element 3 to realize the preliminary decoherence and homogenization, is reflected by the X light merging lens 5 to the fluorescence wheel 4, and is transmitted by the transmission part 42 of the fluorescence wheel when the fluorescence wheel 4 rotates to the position of the transmission part 42, then is converted by the optical path of the relay loop to reach the X light merging lens 5 for reflection and output again. At that moment, the second diffusion element 6 rotates to the position of the blue laser light diffusion part 611, the color filter wheel rotates to the position of the blue light filter plate, so that the blue laser light is diffused and homogenized by the blue laser light diffusion part and then transmits to the blue color filter plate to form into the blue light. When the fluorescence wheel 4 rotates to the reflection part 41, the blue laser light irradiates the green fluorescent powder in the circumference on the surface of the reflection part 41, the emitted green fluorescent light is reflected by the fluorescence wheel and transmitted and output through the X light merging lens 5. At that moment, the second diffusion element 6 rotates to the position of the transparent part 62, the color filter wheel 7 rotates to the position of the green light filter plate, so that the green fluorescent light transmits the transparent part 62 of the second diffusion element 6 and passes through the green light filter plate to form into the green light.

In the similar way, when the red laser device is lighted, the red laser light through the beam shaping device transmits the first diffusion element 3 to realize the preliminary decoherence, it reaches the X light merging lens and is reflected by it. At that moment, the second diffusion element 6 rotates to the position of the red laser light diffusion part 61, the red laser light will pass through 612a, 612b and 612c in order along with the rotation of the red laser light diffusion part 61, so as that the red laser light suffers another diffusion and decoherence. The color filter wheel 7 rotates to the position of the red color filter plate, so that the red laser light transmits the red color filter plate after diffusion through the red laser light diffusion part to form into the red light.

For the more uniform synchronization of the second diffusion element 6 with the color filter wheel 7, the second diffusion element 6 and the color filter wheel 7 can be coaxially connected, the second diffusion element 6 is opposite to the blue color filter plate 71, and in this way, the two components can be driven to rotate together only by one motor.

As illustrated by FIG. 6 within which a bicolor laser light source is provided, the blue laser light and red laser light emitted by the blue and red laser devices firstly pass through the fixedly arranged first diffusion element 3, it can increase the spacial phases of the blue laser beam or red laser beam and destroy the constant phase which is the condition for producing interference to a certain extent. After merging with the fluorescent light, the blue laser light and red laser light pass through the moving second diffusion element 6, since the moving diffusion element itself can produce some random spatial phases for the laser beam compared with the fixedly arranged diffusion element, and accordingly it can effectively destroy the coherence of the laser light; whereas, in some embodiments of the disclosure, the moving diffusion element can further increase more random phases on the basis of the spatial phases increased by the fixed diffusion element by matching the fixed diffusion element with the moving diffusion element, so that the degree of decoherence for the blue laser beam and red laser beam will be higher, more independent speckle patterns can be formed on the projected image, however, the more the independent speckle patterns are, the weaker the phenomenon of light and shade spots will be by using the integral action of human eyes, and accordingly the speckle effect of the laser light can be effectively weakened to improve the display quality of projected images.

Besides, in some embodiments of the disclosure also divides the red laser light diffusion part in the second diffusion element 6 into multiple diffusion subparts according to the characteristic that human eyes are more sensitive to the speckles of the red laser light, and the diffusion subparts in the middle have both bigger areas and greater angles of diffusion for the red laser light than the diffusion subparts on both sides, so that the speckle dissipating effect of the diffusion subparts in the middle on the red laser light can be enhanced.

Moreover, in some embodiments of the disclosure, a speckle dissipating system is shared for the speckle dissipating of the blue laser light and the red laser light. the The speckle dissipating system is composed of a fixedly arranged first diffusion element in the beam shaping device and a moving second diffusion element. Compared with the prior art that it is necessary to design the optical path of speckle dissipating for each of the laser light when a laser light source is used, the speckle dissipating solution in some embodiments of the disclosure has high utilization ratio of optical components and high speckle dissipating efficiency.

At the same time, the optical path of speckle dissipating is not limited to one light source or multiple light sources, or to monochromatic laser light or bicolor laser light, and the optical path of speckle dissipating has universality.

Figure 8:
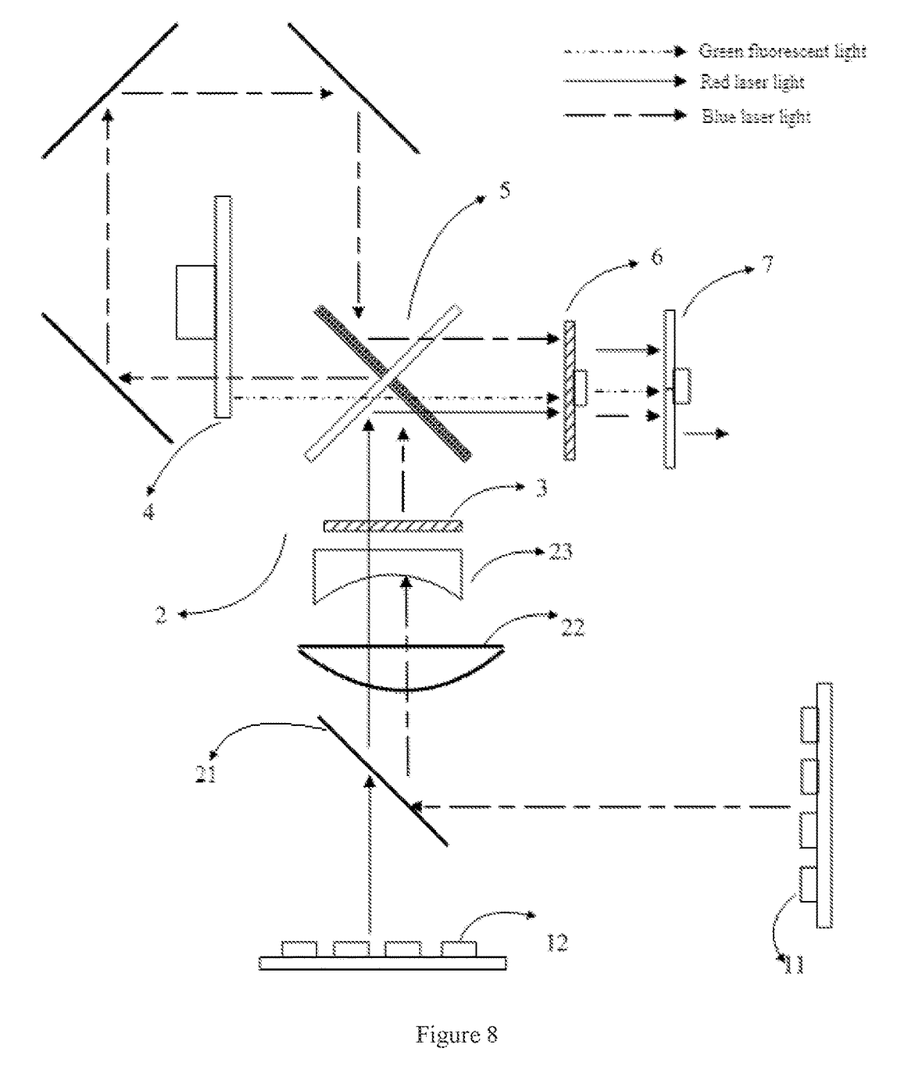
FIG. 8 shows a schematic diagram of still another laser light source in some embodiments of the disclosure.

Similar to the laser light source illustrated by FIG. 6, the laser device in some embodiments of the disclosure as shown in FIG. 8 comprises a blue laser device and a red laser device. For example, the laser device is a bicolor laser device comprising a blue laser device and a red laser device. The blue laser light and the red laser light share a speckle dissipating system composed of a fixedly arranged diffusion element and a moving diffusion element, so that the speckle effect of the blue and red laser lights can be weakened at the same time to achieve the speckle dissipating effect on the laser light source. The main differences between FIG. 8 and FIG. 6 are that the beam shaping devices used are different. Therefore, the same structures and functions as those in FIG. 6 will not be repeated, and the differences will be mainly described.

Since the laser light emitted by the laser device is not in an ideal status and has the problems of uneven distribution of luminance and energy, and bigger beam areas, in the laser light source illustrated by FIG. 8, the red laser light and the blue laser light shall also passes through the beam shaping device for direction conversion, beam bunching, homogenization, etc.

As shown in FIG. 8, the beam shaping device 2 comprises a reflector unit 21, a convex lens 22, a concave lens 23, and a fixedly arranged first diffusion element 3 behind the concave lens. The convex lens 22 and the concave lens 23 form a telescope system. The beam shaping device performs the shaping of reflection, beam bunching and homogenization for the blue laser light and the red laser light in order.

The reflector unit 21 is arranged in front of the blue and the red laser device arrays and is arranged at an included angle of 45° with the two laser light arrays. The reflector unit 21 can be composed by a set of reflectors at intervals, the lens part of the reflectors can reflect one light source, the interval between the reflectors can allow to transmit another light source. Accordingly, the reflection for one light source of the blue and the red laser light sources and the transmission for another light source only by using one reflector unit, so that it not only can reduce the beam separation of the beams output by the two laser light arrays and output the synthetic beam in the same direction, it can also reach the object of compact structure.

In the state shown in FIG. 8, the reflector unit 21 may transmit the red laser light emitted by the red laser array below it and reflect the blue laser light emitted by the blue laser array on its right.

In some embodiments of the disclosure, before reaching the reflector unit 21, the blue laser light and the red laser light also passes a collimating lens (not shown in the figure) for collimation to reduce the angle of diffusion for laser light respectively, so that more quantity of light can reach or transmit through the reflector unit to improve the shaping efficiency of the laser light.

The blue laser light and the red laser light merged by the reflector unit 21 pass the telescope system comprised of the convex lens 22 and the concave lens 23, and the first diffusion element 3 in sequence. This optical path and the optical path thereafter are the same as those in FIG. 6, and the details will not described herein again.

Figure 9:
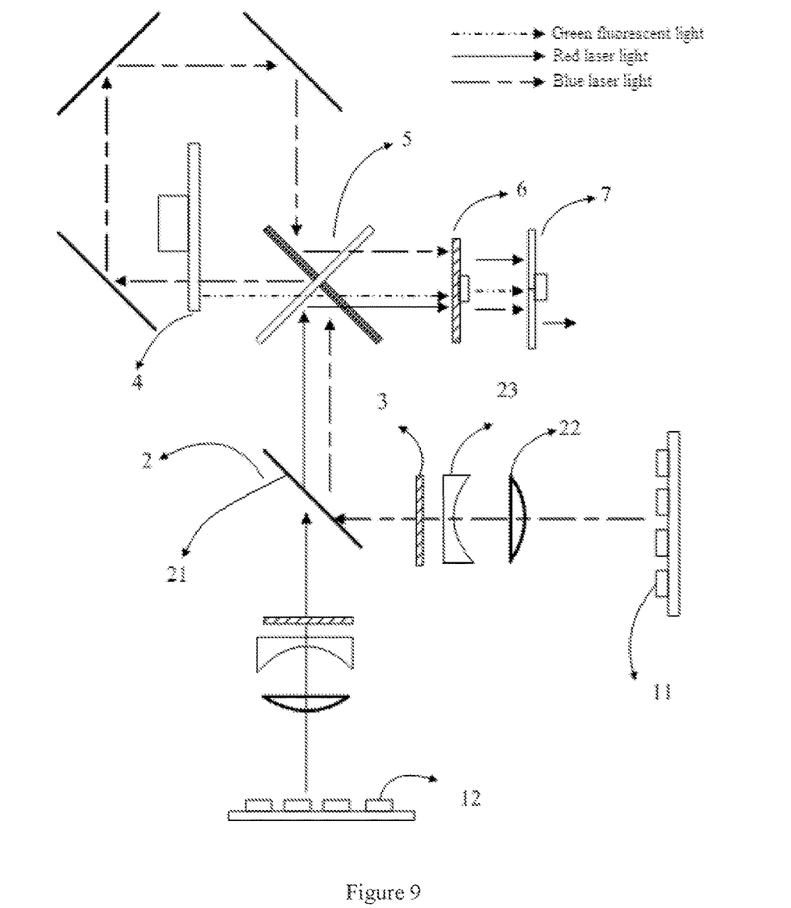
FIG. 9 shows a schematic diagram of still another laser light source in some embodiments of the disclosure.

As shown in FIG. 9, another laser light source is provided in some embodiments of the disclosure. The main differences between FIG. 9 and FIG. 6 are also that the beam shaping devices used are different. Therefore, the same structures and functions as those in FIG. 6 will not be repeated, and the differences will be mainly described.

Since the laser light emitted by the laser device is not in an ideal status and has the problems of uneven distribution of luminance and energy, and bigger beam areas, in the laser light source illustrated by FIG. 8, the red laser light and the blue laser light shall also passes through the beam shaping device for direction conversion, beam bunching, homogenization, etc.

In some embodiments of the disclosure where the laser device comprises a blue laser device configured to emit a blue laser light and a red laser device configured to emit a red laser light, the first diffusion element may comprise two diffusion elements fixed arranged separately. For example, for the blue laser device provided with one first diffusion element, and for the red laser device provided with the other first diffusion element. The blue laser light passes the one first diffusion element before reaching the fluorescence wheel, and the red laser light passes the other first diffusion element and then reach the second diffusion element.

As shown in FIG. 9, the beam shaping device 2 comprises a reflector unit 21, two convex lenses 22, a concave lenses 23, and a fixedly arranged first diffusion element 3 behind each of the concave lens. Each of the convex lens 22 and the corresponding concave lens 23 form a telescope system. The beam shaping device in FIG. 9 performs the shaping of beam bunching, homogenization and reflection in order for the blue laser light and the red laser light, which is different from the the shaping of reflection, beam bunching and homogenization performed in FIGS. 6 and 8 for the blue laser light and the red laser light in order.

In the laser light source illustrated by FIG. 9, a telescope system and a fixedly arranged first diffusion element 3 behind the telescope system are arrange for each of the blue laser light device array 11 and the red laser light device array 12. The blue laser light and the red laser light incident into the reflector unit 21 after the shaping of beam bunching and homogenization performed by its corresponding telescope system and first diffusion element 3, respectively.

The reflector unit 21 is arranged in front of its first diffusion element 3 and is arranged at an included angle of 45° with the two first diffusion elements 3. The reflector unit 21 can be composed by a set of reflectors at intervals, the lens part of the reflectors can reflect one light source, the interval between the reflectors can allow to transmit another light source. Accordingly, the reflection for one light source of the blue and the red laser light sources and the transmission for another light source only by using one reflector unit, so that it not only can reduce the beam separation of the beams output by the two laser light arraysand output the synthetic beam in the same direction, it can also reach the object of compact structure.

In the state shown in FIG. 9, the reflector unit 21 may transmit the red laser light emitted by the red laser array below it and reflect the blue laser light emitted by the blue laser array on its right.

The blue laser light and the red laser light merged by the reflector unit 21 pass the fluorescence wheel 4 and the light merging component 5 in sequence. This optical path and the optical path thereafter are the same as those in FIG. 6, and the details will not described herein again.

Figure 10:
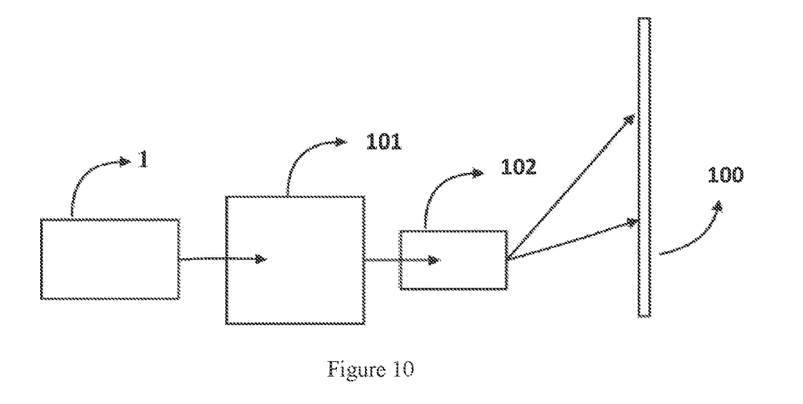
FIG. 10 shows a structural diagram of a projection display device in some embodiments of the disclosure.

Some embodiments of the disclosure provides a projection display device, as shown by the schematic diagram in FIG. 10, the projection display device comprises a laser light source such as the laser device 1, a light machine 101, a lens 103 and a projection screen 100.

The laser light source adopts the laser light source in the above embodiments, light sources mix to form into the white light and sequentially output the three primary colors; the primary colors enter the light machine 101 part through an optical wand (not shown in the figure), in addition to the optical wand structure, the light machine 101 part also comprises an optical path converter and a DMD chip (both not shown in the figure). The DMD chip can be considered as being composed of numerous tiny reflectors, these tiny reflectors can turn over driven by current within a certain range of angle to regulate the quantity of light entering the lens, so that different colors can display on the images. After being modulated by the DMD, the three primary colors of light reach the lens 102 by refraction and convergence for multiple times.

The projection device in the embodiment is a projection device with ultra-short focus, it is applicable for household or portable use. Thus the lens 102 is a projection lens with ultra-short focus, and the projection lens with ultra-short focus has the characteristic that it can still project high-quality images at a low projection ratio. After being modulated by the DMD, the light reaches the lens 102 and is refracted and reflected by a set of optical lenses including multiple convex lenses, concave lenses, non-spherical lenses, etc. arranged within the lens 102, and then are finally projected on the projection screen 100 to form projected images.

For the projection display device provided by the disclosure, the moving diffusion element can further increase more random phases on the basis of the spatial phases increased by the fixed diffusion element by matching a fixedly arranged diffusion element with a moving diffusion element of the laser light source part to jointly realize the speckle dissipating for laser light, so that the degree of decoherence for the original laser beam will be higher, more independent speckle patterns can be formed on the projected image, however, the more the independent speckle patterns are, the weaker the speckle effect will be by using the integral action of human eyes, and accordingly the speckle effect of the laser light can be effectively weakened.

In the projection display device provided by the technical solutionof the disclosure, the laser light source can realize the effective speckle dissipating for the laser light by using two diffusion elements, it has fewer optical devices, simple structure and low complexity of optical architecture, it is favorable for the miniaturized design of the optical system, and at the same time, it also provides conditions for the miniaturized design of projection devices.

Although some embodiments of the the disclosure have been described, one of skill in the art may make other changes and modifications for these embodiments once they know the basic creative ideas. Therefore, the attached claims may be explained to comprise the described embodiments and all the changes and modifications within the range of the disclosure.

One of skill in the art may make various changes and transformations of the disclosure without getting away from the spirit and range of the disclosure. In this way, if these modifications and transformations of the disclosure are within the range of the claims and their equivalent technologies of the disclosure, the disclosure is also intended to contain these modifications and transformations.

What is claimed is:
1. A laser light source, comprising:
a laser device configured to emit a laser light;
a first diffusion element configured to be fixedly arranged;
a second diffusion element configured to rotate around an axis; and
a fluorescence wheel configured to emit a fluorescent light when excited by the laser light, wherein, before reach- ing the fluorescence wheel, the laser light emitted by the laser device transmits through the first diffusion element;

wherein, as the second diffusion element is controlled to rotate around its axis, the laser light from the first diffusion element and the fluorescent light from the fluorescence wheel both transmit through the second diffusion element; and wherein the second diffusion element comprises a diffusion part and a transparent part, the diffusion part is coated with diffusers, and the transparent part is made of materials with high transmittance.

2. The laser light source according to claim 1, wherein, the fluorescence wheel and the second diffusion element rotate synchronously.

3. The laser light source according to claim 1, wherein, the first diffusion element is coated with diffusers in uniform distribution.

4. The laser light source according to claim 1, wherein the laser device is a monochromatic laser device emitting a blue laser light, the first diffusion element is used for transmitting the blue laser light, and the diffusion part of the second diffusion element is used for transmitting the blue laser light.

5. The laser light source according to claim 1, wherein the laser device comprises a blue laser device and a red laser device, and the first diffusion element is used for transmitting a blue laser light from the blue laser device and a red laser light from the red laser device.

6. The laser light source according to claim 5, wherein the diffusion part of the second diffusion element comprises a blue laser light diffusion part used for transmitting the blue laser light and a red laser light diffusion part used for transmitting the red laser light.

7. The laser light source according to claim 6, wherein the red laser light diffusion part comprises multiple diffusion subparts, and the multiple diffusion subparts have different angles of diffusion for the red laser light.

8. The laser light source according to claim 7, wherein among the multiple diffusion subparts, angles of diffusion for the red laser light of the diffusion subparts in a middle are greater than angles of diffusion for the red laser light of the diffusion subparts on both sides.

9. The laser light source according to claim 7, wherein among the multiple diffusion subparts, areas of the diffusion subparts in the middle are bigger than areas of the diffusion subparts on both sides.

10. The laser light source according to claim 1, wherein the diffusers are frosted glass or binary components.

11. The laser light source according to claim 1, wherein before reaching the fluorescence wheel, the laser light emitted by the laser device passes a beam shaping device, and the beam shaping device comprises the first diffusion element.

12. The laser light source according to claim 11, wherein the beam shaping device comprises one reflector, one convex lens and one concave lens, and one first diffusion element;

wherein the laser device is a monochromatic laser device emitting a blue laser light; and wherein the blue laser light reaches the first diffusion element after passing the reflector, the convex lens, and the concave lens in order.

13. The laser light source according to claim 11, wherein the beam shaping device comprises one reflector unit, one convex lens, and one concave lens, and one first diffusion element;

wherein the laser device comprises a blue laser device configured to emit a blue laser light and a red laser device configured to emit a red laser light;

wherein one laser light of the blue and red laser lights is reflected by a reflector unit and the other laser light is transmitted by the reflector unit; and wherein the blue laser light and the red laser light reach the first diffusion element after passing the reflector unit, the convex lens and the concave lens in order.

14. The laser light source according to claim 11, wherein, the beam shaping device comprises one reflector unit, two convex lens and two concave lens, as well as two first diffusion elements;

wherein the laser device comprises a blue laser device configured to emit a blue laser light and a red laser device configured to emit a red laser light, and wherein one convex lens, and one concave lens, and one first diffusion element are provided corresponding to the blue laser device, the other convex lens and the other concave lens, as well as the other first diffusion element are provided corresponding to the red laser device;

wherein the blue laser light and the red laser light reach the reflector unit after passing its convex lens and concave lens, as well as its first diffusion element respectively; and wherein one laser light of the blue and red laser lights is reflected by a reflector unit and the other laser light is transmitted by the reflector unit.

15. The laser light source according to claim 1, wherein the laser device comprises a blue laser device configured to emit a blue laser light and a red laser device configured to emit a red laser light, and the first diffusion element comprises two diffusion elements fixed arranged separately; and wherein the blue laser light passes one of the first diffusion elements before reaching the fluorescence wheel, and the red laser light passes the other first diffusion element and then reach the second diffusion element.

16. The laser light source according to claim 1, wherein further comprises a color filter wheel, and the color filter wheel is provided in an emission direction of the second diffusion element.

17. The laser light source according to claim 16, wherein the fluorescence wheel, the second diffusion element and the color filter wheel rotate synchronously.

18. A projection display device, comprising:
a projection screen;
a light machine;
a lens; and
a laser light source configured to provide illumination for the light machine, and images are projected to the projection screen by the lens for displaying, and wherein the laser light source comprises:
a laser device configured to emit a laser light;
a first diffusion element configured to be fixedly arranged;
a second diffusion element configured to rotate around an axis; and
a fluorescence wheel configured to emit a fluorescent light when excited by the laser light, wherein, before reaching the fluorescence wheel, the laser light emitted by the laser device transmits through the first diffusion element;
wherein, as the second diffusion element is controlled to rotate around its axis, the laser light from the first diffusion element and the fluorescent light from the fluorescence wheel both transmit to the second diffusion element; and wherein the second diffusion element comprises a diffusion part and a transparent part, the diffusion part is coated with diffusers, and the transparent part is made of materials with high transmittance.

* * * * *